Inventor
Gerald J. Carlson
by Louis A. Moucha

Inventor
Gerald J. Carlson
by Louis A. Moucha

United States Patent Office 3,554,646
Patented Jan. 12, 1971

3,554,646
OPTICAL DISTANCE GAGE
Gerald J. Carlson, Scotia, N.Y., assignor to General Electric Company, a corporation of New York
Filed Jan. 28, 1969, Ser. No. 794,622
Int. Cl. G01c 3/08
U.S. Cl. 356—4
16 Claims

ABSTRACT OF THE DISCLOSURE

An instrument for measuring distances to bodies having reflective surfaces and without mechanical contact therewith utilizes an intense light source, rotatable mirror, photo-detector and read-out means. The photo-detector, mirror and reflective surface body are oriented to form a right triangle having a first side of the right angle being of known length $y$ corresponding to the known distance from the center of the rotatable mirror to the optical axis of the photo-detector. The second side of the right angle is the unknown length $x$ corresponding to the unknown distance along the photo-detector optical axis from the instrument to the reflective surface body. The read-out means measures the angle $\alpha$ between the hypotenuse of the right triangle and side $y$ to thereby determine the unknown distance $x$ from the geometric relationship $x = y \tan \alpha$.

---

My invention relates to an instrument for measuring distance to a reflective surface without mechanical contact therewith, and in particular, to an optical distance gage adapted for measuring short distances in the order of one foot with a maximum accuracy of 0.01 to 0.05%.

Many applications such as machine tool control require accurate distance gages for measuring the dimension of a part being machined. The dimension measurement may be a periodic or continuous monitoring of the dimension of the part during the machining process. The advantage of this dimension monitoring while the part is being machined is that it eliminates, or at least substantially reduces, inherent inaccuracies due to machining variables such as tool wear and bending motions. Prior art gaging instruments utilize parts which are in mechanical contact with the part being machined or of the noncontacting type exemplified by the interferometer which has the disadvantage of requiring a count of fringes from a reference zero point in order to measure absolute distance.

Therefore, one of the principal objects of my invention is to provide an optical distance gage for measuring relatively short distances to a body without mechanical contact therewith.

Another object of my invention is to have the elements of the gage oriented to form a right triangle which permits determination of the unknown distance from a simple geometric relationship.

In carrying out the objects of my invention, I provide a light source adapted for emitting a beam of light, a rotatable mirror in optical communication with the light source for reflecting the incident light beam toward a body having a partially reflective surface, and a photo-detector oriented relative to the reflective surface body and rotatable mirror to form a right triangle. The first side of the right angle is a known length $y$ corresponding to a known distance from the center of the rotatable mirror to the optical axis of the photo-detector and perpendicular thereto. The second side of the right angle is the unknown length $x$ corresponding to the unknown distance along the photo-detector optical axis from the reflective surface body to the intersection of side $y$ with the photo-detector optical axis when the reflected light beam impinges on the reflective surface body. A suitable means is provided for measuring the angle or tangent of the angle between the hypotenuse of the triangle and side $y$ to thereby determine the unknown distance $x$ from the geometric relationship $x = y \tan \alpha$.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

Figure 1:
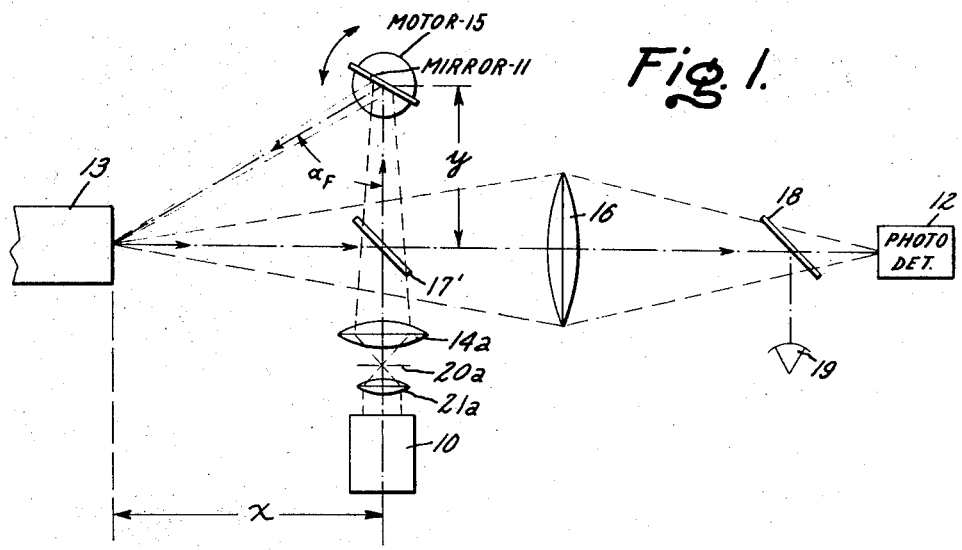
FIG. 1 is a top view illustrating the orientation of the elements of my optical distance gage in a first embodiment wherein the elements are disposed coplanar.
Figure 3A:
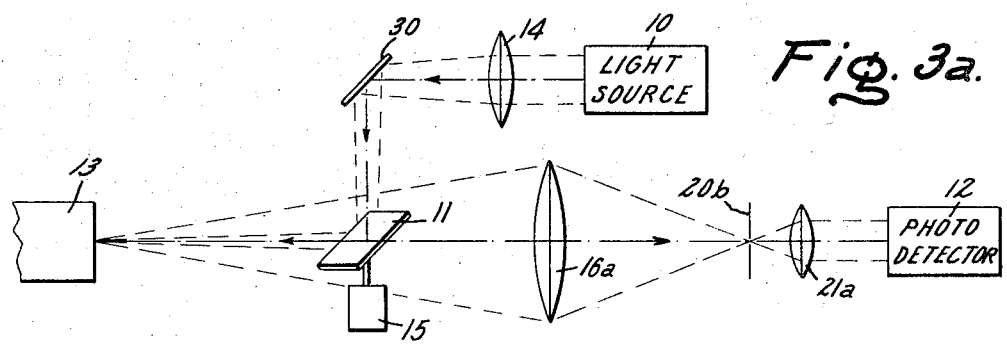
FIGS. 3a and 3b are side and top views, respectively, of a third embodiment wherein the elements are disposed noncoplanar.
Figure 3B:
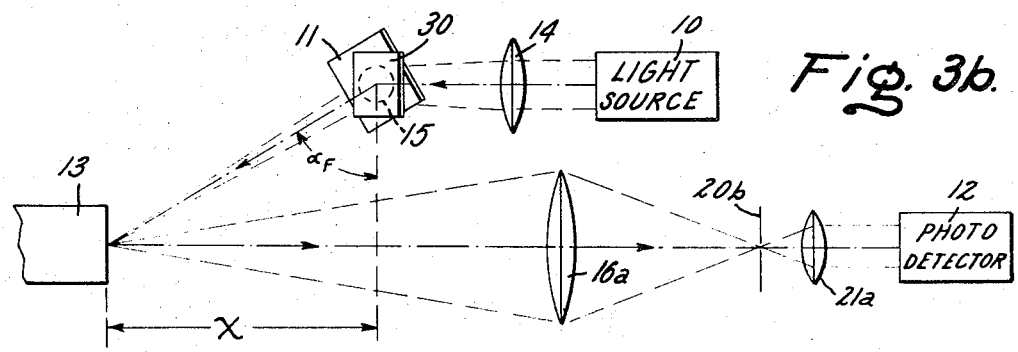
Figure 3C:
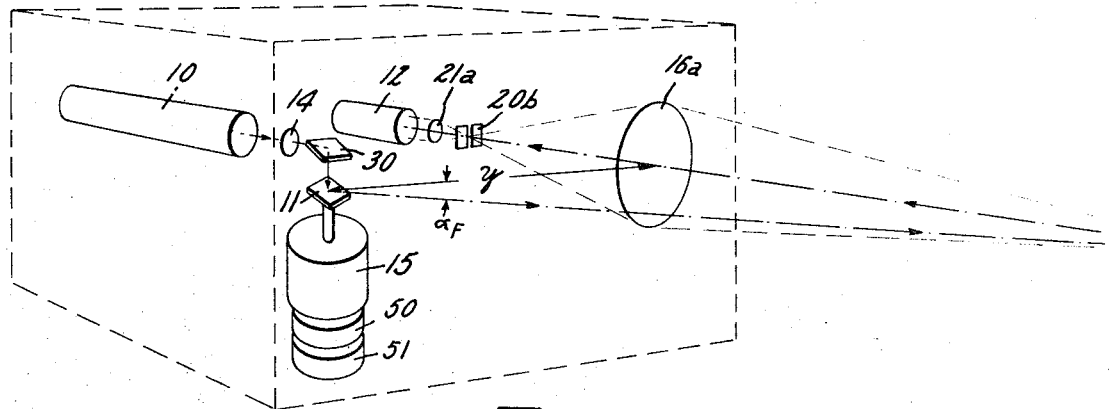
FIG. 3c is a perspective view of the third embodiment.

Referring now in particular to FIG. 1, there is a schematic representation of the elements of my optical distance gage, all elements being disposed coplanar in this particular embodiment. For purposes of convenience only, the view of FIG. 1 may be regarded as a top view although it is to be understood that the various elements could also be included in a vertical plane or at any other angle. The basic elements of my optical distance gage comprise a stable and intense light source 10, a rotatable mirror 11, a photo-detector 12 and a suitable means for determining a particular angle $\alpha_F$ from which the unknown distance $x$ from the surface of a target 13 to the optical distance gage may be determined. In particular, light source 10 is preferably of the type adapted for emitting an intense, relatively narrow beam of light, a laser being one example. An Osrome lamp is another suitable source. A first lens 14 of the double convex or plano-convex type having a long focal length may be utilized in alignment with the optical axis of light source 10 for focussing the light beam emitted from source 10 such that the beam upon reflection from mirror 11 impinges on target 13 as a very small spot, as illustrated in FIGS. 3a, 3b, 3c. Alternatively, lens 14 may be replaced by what is conventionally described in the optics art as a "spatial filter and collimating lens assembly" comprising two lenses 14a, 21a and a pinhole or slit 20a therebetween, the assembly including the slit illustrated in the FIG. 1 embodiment and being preferred since it improves the steepness and linearity of the leading and trailing edges of the light beam signal thereby improving the gage sensitivity and accuracy and also making the gage less sensitive to slight misalignment of the gage elements.

Rotatable mirror 11 is in optical communication with light source 10 and is continuously rotatably driven by any suitable motor means 15 along an arc in the plane of elements 10–13, indicated by the curved arrow heads. The motor shaft which rotates mirror 11 is perpendicular to the coplanar gage elements. Although all of the elements in this first embodiment are stated as being coplanar, it is to be understood that only the center of mirror 11 is coplanar with light source 10, photo-detector 12 and target 13. Thus, the reflective surface plane of mirror 11 is illustrated as being vertical, or perpendicular to the horizontal plane containing the other elements. Mirror 11 is thus adapted for reflecting the incident light beam emitted by source 10 toward target 13 which comprises a body having a somewhat diffuse or partially reflective surface. Target or body 13 is the part being machined when my optical distance gage is utilized in a machine tool control system. Photo-detector 12 is of an appropriate type compatable with the radiation emitted by light source 10. A second lens 16 of the double convex or plano-convex type having a short focal length may be employed along the optical axis of the photo-detector for focussing an image upon the light-sensitive portion of the photo-detector of a small region of the surface 13 which contains a portion of the light reflected from surface 13 along the optical axis of the photo-detector when the reflected light beam impinges on surface 13. Again, alternatively, and preferably, lens 16 may be replaced by a second "spatial filter and collimating lens assembly" including lenses 16a, 21a and slit 20 as illustrated in FIGS. 2, 3a, 3b and 3c. Since the surface of body 13 in the most general case is merely partially reflective, the light reflected therefrom due to the impinging light beam results in considerable scattering of the reflected light and only a small portion is directed along the optical axis of the photo-detector. The straight arrows depicted in the light beam outlined by dashed lines indicate the relative directions of the light beam in its traverse during a measurement of the distance $x$ from the optical gage to surface 13.

Photo-detector 12 is oriented relative to the reflective surface body 13 and rotatable mirror 11 to form a non-physical right triangle in space when the light beam reflected from mirror 11 impinges on the reflective surface body 13 and the reflection therefrom is detected by photo-detector 12. The right angle of the right triangle is formed by the intersection of the light source 10 optical axis and the photo-detector 12 optical axis. A first side of the right angle, herein designated length $y$ corresponds to the known distance from the center of rotatable mirror 11 to the optical axis of the photo-detector and perpendicular thereto. The second side of the right angle is the unknown length $x$ corresponding to the unknown distance along the photo-detector optical axis from the reflective surface body 13 to the intersection of the side $y$ and the photo-detector optical axis. Two embodiments are illustrated in FIGS. 4 and 5 for determining the tangent of the angle $\alpha$ between the hypotenuse of the triangle and side $y$ to thereby determine the unknown distance $x$ from the geometric relationship $x=y \tan \alpha$.

In operation, my gage is mounted some distance from body 13, assume one foot as an example, and the distance to body 13 is measured optically without mechanical contact therewith. My instrument is capable of measuring absolute distances over a range of approximately 4:1 (i.e., from 6 inches to two feet) with a maximum accuracy in the range of 0.01% to 0.05%. The feature of having no element of my optical gage in mechanical contact with a workpiece 13 being machined permits periodic or continuous monitoring during the machining process such that the size of the workpiece (the absolute distance thereto from the gage) is continuously known, and as a result the workpiece can be machined with a relatively high degree of accuracy. Consecutive measurements can be made at a rate of 1 per second or higher. The requirements for successful operation of my gage are a stable mounting for my optical gage and for the part being machined, and line-of-sight viewing to surface 13. In operation, and referring to FIG. 1, the light beam traverses a fixed path from source 10 to rotatable mirror 11, and as the mirror rotates through an angle $\alpha/2$, the converging reflected light beam is transmitted at an angle $\alpha$ with respect to the incident beam. At a particular angle $\alpha_F$, the reflected light beam in the form of a very small spot (if lens 14 or a spatial filter and collimating lens assembly employing a pinhole are used) or preferably a narrow rectangular cross section (if the assembly employs a slit) impinges on a particular area of the workpiece 13 which is being continuously monitoride by photo-detector 12 through lens 16. Thus, as the light beam sweeps past the target 13 area, a pulse appears at the output of photo-detector 12 to provide a signal for reading angle $\alpha_F$ or tan $\alpha_F$ which is then used to compute the unknown distance $x$ from the geometric relationship $x=y \tan \alpha_F$.

Figure 4:
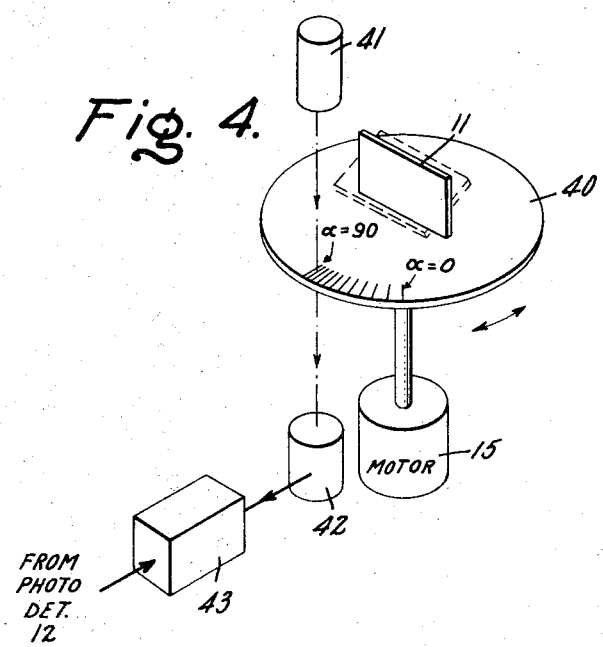
FIG. 4 is a first embodiment of the tan $\alpha$ measuring means for my optical distance gage.
Figure 5:
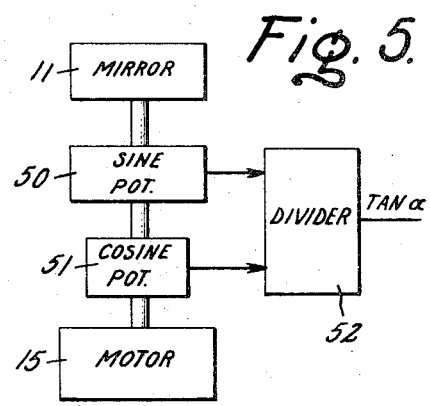
FIG. 5 is a second embodiment of the tan $\alpha$ measuring means.

There are several methods for measuring the unknown angle $\alpha_F$, and as specific examples, (1) mirror 11 is rotated by a constant speed motor to provide a constant angular rate of motion (degrees per unit time) and the time interval between $\alpha=0°$ and $\alpha=\alpha_F$ can be measured and equated to angle $\alpha_F$, (2) mirror 11 is mounted on an encoder disk which contains read-out information in terms of angle $\alpha$ such that angle $\alpha_F$ can be measured directly or indirectly from a disk as the mirror rotates, (3) in like manner, the encoder disk can contain read-out information in terms of the function tangent $\alpha$ as illustrated in FIG. 4 such that the unknown distance $x$ can be obtained directly by multiplying this measurement by the known distance $y$, and (4) sine and cosine potentiometers are mounted on the same shaft which rotates mirror 11 and the outputs of the potentiometers are applied to an electronic divider circuit for obtaining the function tangent $\alpha$. The methods indicated in (3) and (4) are preferred and will be described in greater detail with reference to FIGS. 4 and 5, respectively. The method indicated in (1) obviously requires a suitable means for generating a signal at time $\alpha=0°$ such that the time interval from $\alpha=0°$ to $\alpha=\alpha_F$ can be measured. It should be obvious that, depending upon the read-out means employed, mirror 11 may be continuously rotated through the entire 360° or rotated merely through a small arc to thereby maintain the light beam on target 13. In the latter case, motor means 15 may be a servo motor which operates to maintain mirror at angle $\alpha_F$.

An initial alignment of my optical distance gage can be accomplished by the use of two fixed, half-silvered mirrors 17 and 18. These half-silvered mirrors may be utilized for occasional recalibration of the gage. Half-silvered mirror 17 is fixed in position at the intersection of the light source 10 and photo-detector 12 optical axes and at 45° thereto for intercepting the light beam emitted by source 10 such that half of this light is directed to target 13 at a right angle to the incident beam. The photo-detector 12 is properly aligned when the spot of light at target 13 can be viewed by an observer 19 or at detector 12 by use of the second half-silvered mirror 18 positioned directly in front of photo-detector 12. By this first step, the viewing or optical axis of photo-detector 12 and its associated optics is made perpendicular to the axis of the light beam emitted from source 10.

The alignment of mirror 11 and the associated tangent $\alpha$ function generator which comprises part of the read-out means is established by rotating mirror 11 until the other half of the light beam emitted by source 10 which is transmitted through mirror 17 and reflected back thereto from mirror 11 is positioned on photo-detector 12. Some adjustment in lens 14a focus will be required in this step. With mirror 11 in this position, any adjustments which are necessary, are made, between the encoder disk (or sine and cosine potentiometers) and the read-out optics to establish the $\alpha=0°$ position.

A substantial change in the distance $x$ to be measured will require a refocus of lens 16 and the spatial filter and collimating lens assembly 14a, 20a, 21a.

Figure 2:
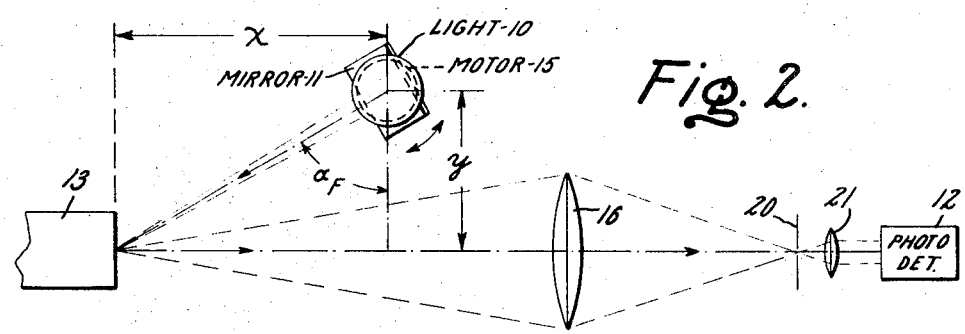
FIG. 2 is a top view of a second embodiment wherein the elements are disposed noncoplanar.

A second embodiment of my optical distance gage is illustrated schematically in FIG. 2 wherein rotatable mirror 11, photo-detector 12 and reflective surface body or target 13 determine one plane, and light source 10 is perpendicular thereto. Thus, the FIG. 2 embodiment is distinguished from the FIG. 1 embodiment in that the light source 10 is not coplanar with elements 11, 12 and 13 as in FIG. 1. In FIG. 2, the reflective surface plane of rotatable mirror 11 is maintained at an angle of 45° with respect to the plane defined by the center of mirror 11 and elements 12 and 13, and is also maintained at a 45° angle relative to the optical axis of light source 10. Mirror 11 is rotatable about its center point while maintaining the respective 45° angles, by means of a suitable motor drive 15 having its shaft aligned with the optical axis of light source 10. A second distinction between the FIGS. 2 and 1 embodiments is that in the FIG. 1 embodiment the angle $\alpha$ between the hypotenuse and side $y$ of the right triangle is also the angle between the incident and reflected light beams at mirror 11, but this is not the case in the FIGS. 2 and 3 embodiments. In all of my embodiments, the angle $\alpha_F$ is the angle between the hypotenuse and side $y$ of the right triangle wherein side $y$ is the known length corresponding to the known distance from the center of rotatable mirror 11 to the optical axis of photo-detector 12 and perpendicular thereto (and unknown length $x$ corresponds to the unknown distance along the detector 12 axis from surface 13 to the intersection of side $y$ with the detector axis). In the FIGS. 2 and 3 embodiments, there is a 1:1 relationship between the change in mirror 11 rotation and the angle $\alpha$ change. This is a third and most important distinction since the mirror angle read-out accuracy no longer has to be twice as precise as $\alpha$, as in the case of FIG. 1. The half-silvered mirrors used for alignment purposes, and illustrated in the FIG. 1 embodiment, can also be utilized in the alignment of the FIGS. 2 and 3 embodiments. Although not illustrated, for purposes of simplification, it is to be understood that a lens 14 or preferably a spatial filter and collimating lens assembly are positioned along the light source 10 optical axis between the light source and mirror 11.

One of the factors in obtaining a relatively high degree of distance measurement accuracy is the precision with which the beam of light is detected as it sweeps by the target area. The edge of this beam must be well defined, and as stated above, it is preferably detected through the slit optics 20b to insure that a trigger pulse is generated from the same point on the beam profile each time it sweeps over the target. A slit width in the order of 0.005 inch in adequate and consistent with the resolution requirements of my invention. The spatial filter and collimating lens assemblies comprising lens 16a, 21a and slot 20b are illustrated in FIGS. 2, and 3a, 3b, 3c but obviously are preferably utilized in each of the embodiments, and in particular, in conjunction with a similar assembly at the light source 10 end of my gage.

A third, and preferred embodiment of my optical distance gage is illustrated in FIGS. 3a, 3b and 3c wherein FIGS. 3a and 3b are side and top views, respectively of the elements of the gage, and FIG. 3c is a perspective view of the gage when enclosed in its housing. This embodiment is preferred since it can be packaged in a compact housing as shown (in dashed outline) in FIG. 3c. As in the case of the FIG. 2 embodiment, light source 10 is not coplanar with elements 11, 12 and 13, but is distinguished from the FIG. 2 embodiment in that the optical axis of light source 10 is parallel to the plane containing elements 10, 11 and 13, and in particular, the optical axes of light source 10 and photo-detector 12 are parallel. As most clearly indicated in FIGS. 3a and 3c, a fixed second mirror 30 is utilized to direct the light beam emitted from light source 10 to the rotatable mirror 11. Mirror 30 is mounted in a fixed position at an angle of 45° with respect to the optical axis of light source 10 and the plane defined by elements 11–13 such that the light beam reflected from mirror 30 is directed vertically downward to rotatable mirror 11. Mirror 11 is also maintained at a 45° angle with respect to the plane defined by the center of mirror 11 and elements 12, 13 and is rotatable about its center point by means of a suitable motor drive 15 having its shaft aligned with the reflected optical axis of mirror 30. The light beam emitted from source 10 is thus directed through lens 14 to fixed mirror 30, reflected therefrom to rotatable mirror 11, and when the latter mirror is angularly positioned at the desired angle $\alpha_F$ the light beam impinges on the reflective surface of body 13 and the portion of the light reflected along the photo-detector 12 optical axis is collected by lens 16 and converged upon the photo-detector. Thus, as in the case of the embodiments of FIGS. 1 and 2, angle $\alpha_F$, side $y$ and the hypotenuse of the right triangle are all located in the plane defined by elements 11, 12 and 13.

The perspective view of FIG. 3c also illustrates the sine and cosine potentiometers utilized in determining the tangent of the angle $\alpha_F$, the potentiometers being mounted on the shaft driven by motor 15 which also rotates mirror 11. The entire optical distance gage including the sine and cosine potentiometers and motor drive are shown contained in a rectangular shaped housing which, in one example, has length and width dimensions each of 12 inches and a height of 10 inches. For this particular example, the largest size elements are: light source 10 is a $H_eN_e$ gas laser of 1½ inch diameter and 7 inch length, photo-detector 12 is of 1½ inch diameter and 5 inch length, lens 16 is of 4 inch diameter and motor 15 is of 4 inch diameter and 4 inch axial length.

FIG. 4 is a first embodiment of a means for measuring angles $\alpha_F$ or tangent $\alpha_F$. The readout means for my optical distance gage includes a means for measuring the angle or tangent of the angle and for developing an electrical signal which is proportional to the function, tangent $\alpha_F$. The elements of the readout means comprise an encoder disk 40 on which is mounted rotatable mirror 11, a second light source 41, a second photo-detector 42 and an electronic pulse counter 43. Encoder disk 40 is mounted on the shaft driven by motor 15 such that mirror 11 and disk 40 are driven synchronously. Encoder disk 40 is fabricated from a transparent material such as glass and provided with a series of ruling lines along at least a portion of the periphery of the disk. The ruling lines may be equally spaced and represent increments of the angle $\alpha$, but preferably are unequally spaced, as shown, and represent increments of the tangent of angle $\alpha$. The lines are placed on the disk by photographic techniques which are conventional in the art. The readout system consists of fixed light source 41 on one side of the disk and a photo-detector 42 oriented on the opposite side of the disk in alignment with the optical axis of light source 41. In the angle $\alpha=0°$ position of encoder disk 40, the optical axis of light source 41 is at the fixed point along the periphery of the disk corresponding to $\alpha=0°$. As disk 40 rotates, each ruling line passing by the detector develops a pulse at the output of detector 42 and the number of ruling lines passing by the detector (i.e. the pulses generated) are proportional to the desired function, tangent $\alpha$. Pulse counter 43 is connected to the output of photo-detector 42 and totalizes the number of pulses generated by the tangent $\alpha$ function generator and stores the accumulated tangent $\alpha$ values. When the light beam reflected from rotatable mirror 11 passes by the target 13, a pulse is generated in photo-detector 12 which has its output also connected to counter 43, and this latter pulse stops the counter whereby the tangent $\alpha$ pulses stored therein now represent the desired value of tangent $\alpha_F$. This desired value of tangent $\alpha_F$ when multiplied by known dimension $y$ obtains the unknown distance $x$.

The particular set of ruling lines indicated on encoder disk 40 in FIG. 4 obtain only one measurement of tangent $\alpha_F$ for each revolution of the disk. Measurements on a more frequent basis are obtained by repeating the ruling line pattern on other segments of the disk and replacing the simple mirror 11 with a proper polygon mirror. The polygon mirror introduces a slight error, but proper calibration of the readout means can reduce or even eliminate this error. Since the ruling lines occupy only 45° of the periphery of disk 40 in embodiment 1 or 90° in embodiments 2 and 3, a total of eight sets or four sets, respectively, of ruling lines can be accommodated per each revolution of the disk. If the full range of tangent $\alpha=0°$ to $\alpha=90°$ is not required, thereby yielding some restrictions in the range of measurement of the distance $x$, a greater number of sets of ruling lines may be utilized on the disk to obtain more measurements per revolution.

The inherent accuracy of the readout system is the precision with which the tangent α ruling lines can be scribed on the disk. A precision in the order of a few tenths of a second of arc is within the state-of-art of glass disk rulings and is more than adequate for my optical distance gage application. However, there are practical limits to the number of lines that can be scribed on a disk of given size since with increasing number of lines, diffraction problems increase. The practical limit to line density of approximately 2000 lines per inch over the region of the disk having the greatest concentration of lines is sufficiently precise for a disk of 5 inch radius whereby the angular separation between lines in this region is 20.6 seconds of arc. This corresponds to a change of 20.6 seconds of arc in α for the FIGS. 2 and 3 embodiments. Since the disk rotates through angles of α/2 for the FIG. 1 embodiment, the change in α will be 41.2 seconds of arc for each line of a 2000 line per inch pattern. The maximum accuracy in measuring $x$ is at angle $\alpha_F=45°$ and for a 5 inch radius disk in the FIGS. 2 and 3 embodiments, a maximum accuracy of 0.02% is obtained for angle α change of 20.6 seconds of arc. Obviously a greater accuracy is obtained with a greater radius disk.

FIG. 5 is a second embodiment of the targent α measuring means and comprises sine 50 and cosine 51 potentiometers mounted on the shaft which rotates mirror 11. As in the case of the encoder disk embodiment, the sine and cosine potentiometers must be properly aligned at the angle=0° position to obtain an accurate output. The output of the sine and cosine potentiometers are applied to an electronic divider circuit 52 to obtain at the output thereof an electrical signal having a voltage magnitude directly proportional to tangent α. The use of conventional sine and cosine potentiometers results in a less expensive and more compact embodiment of gage design, however, the accuracy is reduced to the order of 1%.

From the foregoing description, it can be appreciated that my invention attains the objectives set forth and makes available an optical distance gage for measuring relatively short distances to a body without mechanical contact therewith. Consecutive distance measurements may be made at the rate of 1 per second or higher such that a part being machined may be periodically or almost continuously monitored during the machining process. Having described my invention, it is believed obvious that modification and variation of my invention is possible in light of the above teachings. Thus, the light source 10 may be oriented at various positions, other than as illustrated hereinabove, with or without additional optics, the only criterion being that the right triangle be formed with sides $x$, $y$ and angle $\alpha_F$ as described. Also, mirror 11 can be servoed to a null position at $\alpha_F$ or manuualy turned through a gear drive to this position.

It is, therefore, to be understood that changes may be made in the particular embodiments as described which are within the full intended scope of the invention as defined by the following claims.

What I claim as new and desire to secure by Letters Patent of the United States is:

1. An optical distance gage for measuring the distance to a body having a partially reflective surface without mechanical contact therewith comprising
    an intense light source adapted for emitting a beam of light,
    a rotatable mirror in optical communication with said light source for reflecting the incident light beam toward a body having a partially reflective surface,
    a photo-detector oriented relative to the reflective surface body and said rotatable mirror to form a right triangle having a first side of the right angle being of known length $y$ corresponding to the known distance from the center of said rotatable mirror to the optical axis of said photo-detector and perpendicular thereto when the reflected light beam impinges on the reflective surface body, the second side of the right angle being of unknown length $x$ corresponding to the unknown distance along the photo-detector optical axis from the reflective surface body to the intersection of side $y$ with the photo-detector optical axis, and
    means for measuring the angle α between the hypotenuse of the triangle and side $y$ to thereby determine the unknown distance $x$ from the geometric relationship $x=y \tan \alpha$.

2. The optical distance gage set forth in claim 1 wherein
    said light source, rotatable mirror, photo-detector and reflective surface body are disposed coplanar.

3. The optical distance gage set forth in claim 1 wherein
    said light source, rotatable mirror, photo-detector and reflective surface body are disposed noncoplanar.

4. The optical distance gage set forth in claim 2 wherein
    the optical axis of said light source is in alignment with side $y$ of the right triangle whereby the light beam emitted from said light source is directed along side $y$ towards said rotatable mirror.

5. The optical distance gage set forth in claim 3 wherein
    the optical axis of said light source is perpendicular to side $y$ of the right triangle.

6. The optical distance gage set forth in claim 5 wherein
    the optical axis of said light source is perpendicular to a plane including said rotatable mirror, reflective surface body and photo-detector.

7. The optical distance gage set forth in claim 5 wherein
    the optical axis of said light source is spaced from and parallel to a plane including said rotatable mirror, reflective surface body and photo-detector.

8. The optical distance gage set forth in claim 5 wherein
    the optical axis of said light source is parallel to the optical axis of said photo-detector.

9. The optical distance gage set forth in claim 1 wherein said angle measuring means comprise
    an encoder disk upon which said rotatable mirror is mounted, said encoder disk fabricated from a transparent material and provided with a series of equally spaced ruling lines along at least a portion of the periphery of the disk wherein the ruling lines represent increments of the angle α,
    a second light source positioned on one side of said encoder disk for directing a beam of light at a fixed point along the ruled line periphery of said disk,
    a second photo-detector oriented on the opposite side of said encoder disk in alignment with the optical axis of said second light source for detecting the ruling lines passing by said second photo-detector due to the rotation of said rotatable mirror from a zero angle reference to the desired angle $\alpha_F$ at which the light beam reflected by said rotatable mirror is incident upon the reflective surface body, and
    means for counting the ruling lines passing by said second photo-detector to thereby determine the magnitude of angle $\alpha_F$.

10. The optical distance gage set forth in claim 1 wherein
    said angle measurements comprise
        an encoder disk upon which said rotatable mirror is mounted, said encoder disk fabricated from a transparent material and provided with a series of ruling lines along at least a portion of the periphery of the disk wherein the ruling lines represent increments of the tangent of angle α,
        a second light source positioned on one side of said encoder disk for directing a beam of light at a fixed point along the periphery of said disk, a second photo-detector oriented on the opposite side of said encoder disk in alignment with the optical axis of said second light source for detecting the ruling lines passing by said second photo-detector due to the rotation of said rotatable mirror from a zero angle reference to the desired angle $\alpha_F$ at which the light beam reflected by said rotatable mirror is incident upon the reflective surface body, and means for counting the ruling lines passing by said second photo-detector to thereby determine the quantity tan $\alpha_F$.

11. The optical distance gage set forth in claim 1 wherein
said angle measuring means comprise a sine potentiometer and a cosine potentiometer rotatable synchronously with said rotatable mirror, the electrical signal output of said sine and cosine potentiometers applied to the inputs of an electronic divider circuit to provide at the output thereof an electrical signal directly proportional to tan $\alpha$.

12. The optical distance gage set forth in claim 1 wherein
said rotatable mirror is rotated at a constant angular velocity, and
said angle measuring means comprises means for measuring the time interval in which said rotatable mirror rotates from a zero angle reference $\alpha=0$ to the desired angle $\alpha_F$ at which the light beam reflected by said rotatable mirror is incident upon the reflective surface body.

13. The optical distance gage set forth in claim 1 wherein said light source comprises a laser.

14. The optical distance gage set forth in claim 1 and further comprising
a double convex lens for converging onto said photo-detector the light reflected from the reflective surface body along the optical axis of said photo-detector.

15. The optical distance gage set forth in claim 1 and further comprising
a first spatial filter and collimating lens assembly aligned with the optical axis of said light source and positioned intermediate said light source and said rotatable mirror for focussing the light beam onto the reflective surface body as a small spot of predetermined geometry.

16. The optical distance gage set forth in claim 15 and further comprising
a second spatial filter and collimating lens assembly aligned with the optical axis of said photo-detector and positioned intermediate the reflective surface body and said photo-detector for focussing the light beam reflected from a small region of the reflective surface body onto said photo-detector.

References Cited

UNITED STATES PATENTS

| | | | |
|---|---|---|---|
| 2,468,042 | 4/1949 | Cranberg | 356—1 |
| 2,481,034 | 9/1949 | Neufeld | 356—1 |

RODNEY D. BENNETT, Primary Examiner

J. P. MORRIS, Assistant Examiner